United States Patent
van Bekkum et al.

(10) Patent No.: US 6,513,391 B2
(45) Date of Patent: Feb. 4, 2003

(54) TRANSMITTING AND/OR RECEIVING HEAD FOR SONIC FLOWMETERS

(76) Inventors: Jan Aart van Bekkum, Groeneweg 69, Hoornaar 4223 MG (NL); Alexander Marnix Heijnsdijk, Schoorweg 79, 3356 BW Papendrecht (NL); Cornelis Johannes Hogendoorn, Anjelierstraat 14, 4261 CK Wijk en Aalburg (NL); Arie Huijzer, Weresteyn 118, 3363 BS Sliedrecht (NL); Marcel Meijlom Molenaar, Toulonsestraat 51, 3311 LT Dordrecht (NL); John C. Visser, Kraal 5, 3362 WE Sliedrecht (NL)

( * ) Notice: Subject to any disclaimer, the term of this patent is extended or adjusted under 35 U.S.C. 154(b) by 0 days.

(21) Appl. No.: 10/079,648

(22) Filed: Feb. 20, 2002

(65) Prior Publication Data

US 2002/0104384 A1 Aug. 8, 2002

Related U.S. Application Data

(63) Continuation of application No. 09/313,135, filed on May 17, 1999, now abandoned.

(51) Int. Cl.$^7$ ................................................. G01F 1/66
(52) U.S. Cl. .................................................. 73/861.27
(58) Field of Search ...................... 73/861.27; 417/322; 359/285; 367/137; 128/662.03; 134/1; 315/3.5; 250/206.2

(56) References Cited

U.S. PATENT DOCUMENTS

| | | | | |
|---|---|---|---|---|
| 4,914,284 A | * | 4/1990 | Halldorsson et al. | .... 250/206.2 |
| 5,017,236 A | * | 5/1991 | Moxness et al. | ................ 134/1 |
| 5,386,395 A | * | 1/1995 | Le Guerinel et al. | ....... 367/137 |
| 6,010,316 A | * | 1/2000 | Haller et al. | ................. 417/322 |
| 6,043,924 A | * | 3/2000 | Montgomery et al. | ...... 359/285 |
| 6,356,023 B1 | * | 3/2002 | Kosmahl | .................... 315/3.5 |

* cited by examiner

Primary Examiner—Hezron Williams
Assistant Examiner—Jewel V. Thompson
(74) Attorney, Agent, or Firm—Cesari & McKenna, LLP

(57) ABSTRACT

A transmitting and/or receiving head for a sonic flowmeter measuring moving fluids by the runtime method, with an enclosure, an ultrasonic transducer transmitting ultrasound signals into and/or receiving ultrasound signals from the moving fluid and with an ultrasound waveguide by way of which the ultrasound signals are injected into and/or extracted from the moving fluid. The transmitting and/or receiving head is particularly well suited to utilization in a sonic flowmeter for very hot fluids, especially hot gases, by virtue of the fact that it employs an ultrasound waveguide in the form of an elongated sonic funnel offering high thermal conduction resistance.

11 Claims, 2 Drawing Sheets

TRANSMITTING AND/OR RECEIVING HEAD FOR SONIC FLOWMETERS

RELATED APPLICATION

This application is a continuation of Ser. No. 09/313,135, filed May 17, 1999, now abandoned.

BACKGROUND OF THE INVENTION

This invention relates to a transmitting and/or receiving head for a sonic flowmeter for fluids, which operates by the runtime principle and incorporates an enclosure, an ultrasonic transducer that transmits ultrasound signals into the moving fluid and/or receives such signals from the moving fluid, and an ultrasound waveguide by way of which the ultrasound signals are injected into and/or extracted from the moving fluid.

Ultrasound-based flowmeters are being used to a progressively increasing extent for industrial flow-rate measurements of fluids, i.e. moving liquids and gases. Their particular advantage lies in the fact that, much like for instance magneto-inductive flowmeters, they permit "non-contact" flow measurements without requiring any interfering structure in the flow path.

The two key measuring methods used with sonic flowmeters involve the runtime and the Doppler principle, respectively, with the runtime method offering substantially better attainable accuracy than the Doppler approach. It is for that reason that sonic flowmeters employing the runtime method, and especially the differential-runtime method, are generally preferred.

The runtime of an ultrasound signal along the measuring path from the transmitting ultrasonic transducer to the receiving ultrasonic transducer in a given fluid is a function of the sound propagation speed and the flow rate of the fluid (entrainment). This is the underlying operating principle of runtime-based sonic flowmeters. In the differential runtime method, ultrasound signals are transmitted upstream and downstream through the fluid either in alternating fashion or simultaneously. Due to their different propagation rates over the measuring path having geometrically identical length, the upstream and downstream signals arrive at their respective receiving ultrasonic transducers after different runtimes. The runtime difference between the two soundwaves is directly proportional to the flow rate of the moving fluid.

Ultrasound measurements of a flowing medium necessarily require a measuring tube through which passes the fluid to be measured, plus at least one ultrasonic transducer and preferably two ultrasonic transducers axially offset relative to each other in the flow direction, as well as a control circuit and an analytical circuit for determining the runtime of the ultrasound signals. Beyond that, the control and analysis circuitry can derive from the runtime the flow speed and the flow volume or other parameters of the moving fluid.

Given that, due to their high accuracy and operational reliability, sonic flowmeters have been used with such great success and many more potential uses are opening up for these flowmeters. Salient among these are applications involving high-temperature fluids. Utilization in the realm of petroleum and natural-gas extraction is but one example.

High temperatures, however, pose a significant problem for the application of sonic flowmeters. In general, the base component of an ultrasonic transducer is a piezo crystal, which limits conventional flowmeters to a temperature range peaking at 150° C. Any higher temperatures will cause the piezo crystals to become failure-prone or totally disfunctional.

The publication JP 61-93914 A, which gave rise to this invention, describes a sonic flowmeter in which the ultrasonic transducer inserts the ultrasound signals into the moving fluid by way of an ultrasound waveguide. This earlier sonic flowmeter attempts to raise the permissible fluid temperature limit by avoiding direct contact between the ultrasonic transducer and the fluid and, instead, incorporating an ultrasound waveguide between the moving fluid and the ultrasonic transducer. That design has certain shortcomings, however, in that, for one, the decay time of the ultrasound signals is very long due to the strong reflections of the ultrasound signals along the boundary surfaces of the ultrasound waveguide, while there is also a substantial risk of ultrasound-signal crosstalk between the ultrasound waveguide and the measuring tube as well as the enclosure. Moreover, at the point of transition between the ultrasound waveguide and the moving fluid, a significant part of the energy of the ultrasound signal emanating from the ultrasonic transducer is retroreflected into the ultrasound waveguide. The rather minimal transmission factor of the ultrasound signal, attributable to the varying impedances of the ultrasound waveguide and the moving fluid, is proportional to the impedance and inversely proportional to the temperature of the fluid. It follows that if, for example, one wants to determine the flow rate of a hot gaseous fluid, the sonic power injected into the gas is too weak in the case of conventional sonic flowmeters to be received by the other ultrasonic transducer, the impedance of the hot gas being very low.

SUMMARY OF THE INVENTION

This invention is, therefore, aimed at enhancing and improving the concept of the earlier sonic flowmeters in a way as to avoid these shortcomings, permitting reliable and accurate flow measurements even of hot fluids and especially hot gases.

According to the invention, this is accomplished by means of a specially designed transceiver head basically and essentially characterized in that the head employs as the ultrasound waveguide an elongated sonic finnel offering high thermal conduction resistance. First of all, a sonic funnel focusses the sonic energy so that in terms of a particular cross-sectional plane, a stronger sonic signal can be injected into the fluid. In addition, a suitably dimensioned sonic funnel will ensure a sufficient relative temperature drop between the fluid and the ultrasonic transducer. The thermal conduction resistance of the sonnic funnel is determined using the following equation:

$$R = \int_{ymu}^{L} [A(y)\lambda(y)]^{-1} dy \qquad \text{Equation (1)}$$

where A is the cross-sectional plane, L the length and $\lambda$ the thermal conductivity of the sonic funnel. By suitably dimensioning the cross section A, the length L and the thermal conductivity $\lambda$ it is possible to produce a sonic funnel with a thermal conduction resistance R sufficiently high to prevent the temperature at the ultrasonic transducer from exceeding the permissible level.

In a preferred embodiment of the transceiver according to this invention, it is desirable to provide the sonic funnel with an at least partly circular, cylindrical funnel sleeve. It is also desirable to close off the end of the sonic funnel facing the fluid with a window through which the ultrasound signals are injected into and/or extracted from the fluid. If, in fact, the sonic funnel is equipped with a funnel sleeve, it will be very desirable to close off the sonic funnel and the funnel sleeve with a window. Optimal injection of the ultrasound signals into the fluid and extraction of the ultrasound signals from the fluid can be ensured preferably by centering the sonic funnel on the window and by dimensioning the diameter and thickness of the window in such fashion that the highest possible oscillation amplitude of the window can be attained.

A particularly preferred embodiment of the transmitting and/or receiving head according to this invention is further characterized in that the funnel sleeve is provided with attenuation so as to dissipate the reflected ultrasound waves in the funnel sleeve. This conversion of the sonic energy into heat loss is further enhanced by positioning an impedance matching element in front of the attenuation element on the side facing the window. This impedance matching element causes the undesirable sonic reflections in the funnel sleeve to be shunted into the attenuator. Using this type of impedance matching can improve the effectiveness of the attenuator by a factor of about 2. Overall, combining attenuation and impedance matching is particularly useful in shortening the decay time of the ultrasound signal and reducing the ultrasound-signal crosstalk between the funnel sleeve and the enclosure.

The transceiver according to this invention works especially well in a sonic flowmeter equipped with two such transceivers as well as control and analysis circuitry, where the said control and analysis circuitry serves to measure the runtime for determining the volumetric flow. This control and analysis circuitry preferably uses the difference between the total runtime of the ultrasound signals between the ultrasonic transducers and the sum of the runtimes of the ultrasound signals in the sonic funnels for determining the volumetric flow.

There are numerous individual possibilities to further enhance and expand the disclosed transmitting and/or receiving head for a sonic flowmeter. Reference to these is made in the dependent patent claims, as well as in the following description of a preferred embodiment explained with the aid of the following drawings.

DETAILED DESCRIPTION OF AN ILLUSTRATIVE EMBODIMENT

Figure 1:
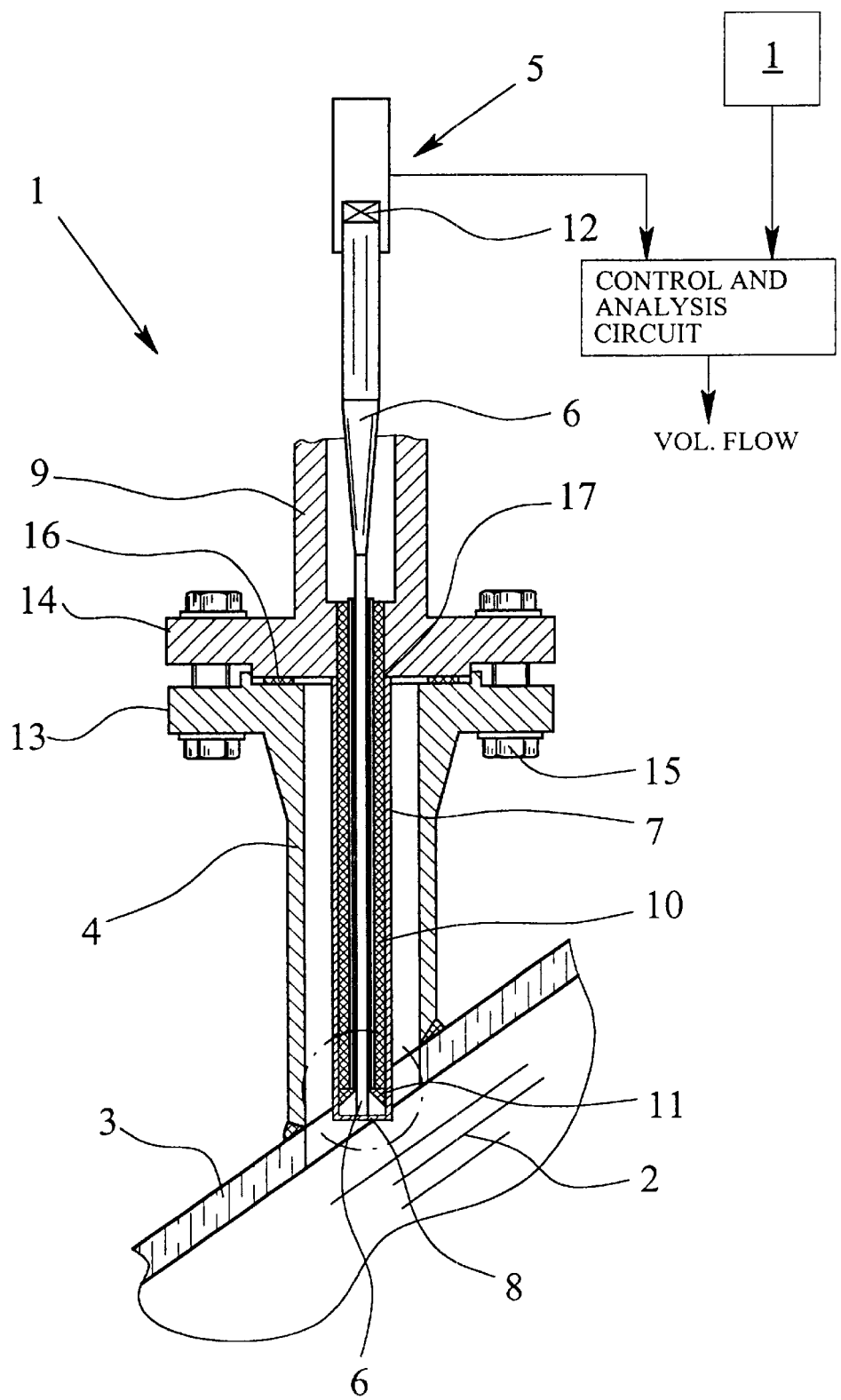
FIG. 1 shows an embodiment of a sonic-flowmeter transceiver according to this invention.

FIG. 1 illustrates a preferred embodiment of a transmitting and/or receiving head 1 of a runtime-based sonic-flowmeter according to this invention. The fluid 2, the flow rate of which is to be measured, passes through a measuring tube 3, marginally indicated in FIG. 1. Since sonic flowmeters of the type here discussed, meaning those employing the runtime principle, are widely known, FIG. 1 is limited to showing the sonic-flowmeter transceiver 1 according to this invention and the measuring tube 3. Other than that, to avoid redundancies as far as sonic flowmeters of the type discussed are concerned, reference is made to the German patent disclosures 195 30 807, 196 33 558 and 196 48 784. The disclosure contents of those earlier publications are, by reference, expressly made a part of the disclosure contents of this present description. This also applies in particular to the control and analysis circuitry as described in the German patent disclosure 195 30 807.

The transceiver 1 according to this invention, illustrated in FIG. 1, includes an enclosure 4 which, in the embodiment shown, is welded to the marginally indicated measuring tube 3, an ultrasonic transducer 5 which transmits ultrasound signals into the moving fluid 2 and/or receives such signals from the fluid 2, and an ultrasound waveguide by way of which the ultrasound signals are injected into and/or extracted from the moving fluid 2.

The terms and expressions "transmitting and/or receiving head 1", "transmitting into and/or receiving from the moving fluid 2" and "injected into and/or extracted from the moving fluid 2" have been and will be used because there exist various types of sonic flowmeters employing the runtime principle, including those which incorporate only one ultrasonic transducer as well as others which feature two or more ultrasonic transducers.

In sonic flowmeters equipped with only one ultrasonic transducer, the latter serves as both a transmitting and receiving device. For that type of sonic flowmeter, the transceiver according to this invention incorporates, apart from the enclosure, an ultrasonic transducer which transmits ultrasound signals into the moving fluid and receives ultrasound signals from the said fluid, as well as an ultrasound waveguide by way of which the ultrasound signals are injected into and/or extracted from the moving fluid.

In sonic flowmeters equipped with at least two ultrasonic transducers, a differentiation is made between those in which the ultrasonic transducers perform the dual function of transmitting and receiving, and others in which at least one of the ultrasonic transducers only transmits and at least one other ultrasonic transducer only receives. For the dual-purpose transmitting and receiving ultrasonic transducer, the above statement regarding single-transducer sonic flowmeters applies. For models in which at least one ultrasonic transducer only transmits and at least one other ultrasonic transducer only receives, the device according to this invention is a transmitting or receiving head incorporating, apart from the enclosure, an ultrasonic transducer transmitting ultrasound signals into the moving fluid or receiving such signals from said fluid, and an ultrasound waveguide by way of which the ultrasound signals are injected into or extracted from the moving fluid.

For the purpose of this invention it does not matter whether within the scope of the above description it, i.e. the invention, refers to a transceiver, i.e. "transmitting and receiving head" or to a "transmitting or receiving head".

The basic inventive concept of the transmitting and/or receiving head 1 shown in FIG. 1 is the provision of an elongated sonic funnel 6 offering high thermal conduction resistance. What this accomplishes has been discussed above and need not be repeated.

Figure 2:
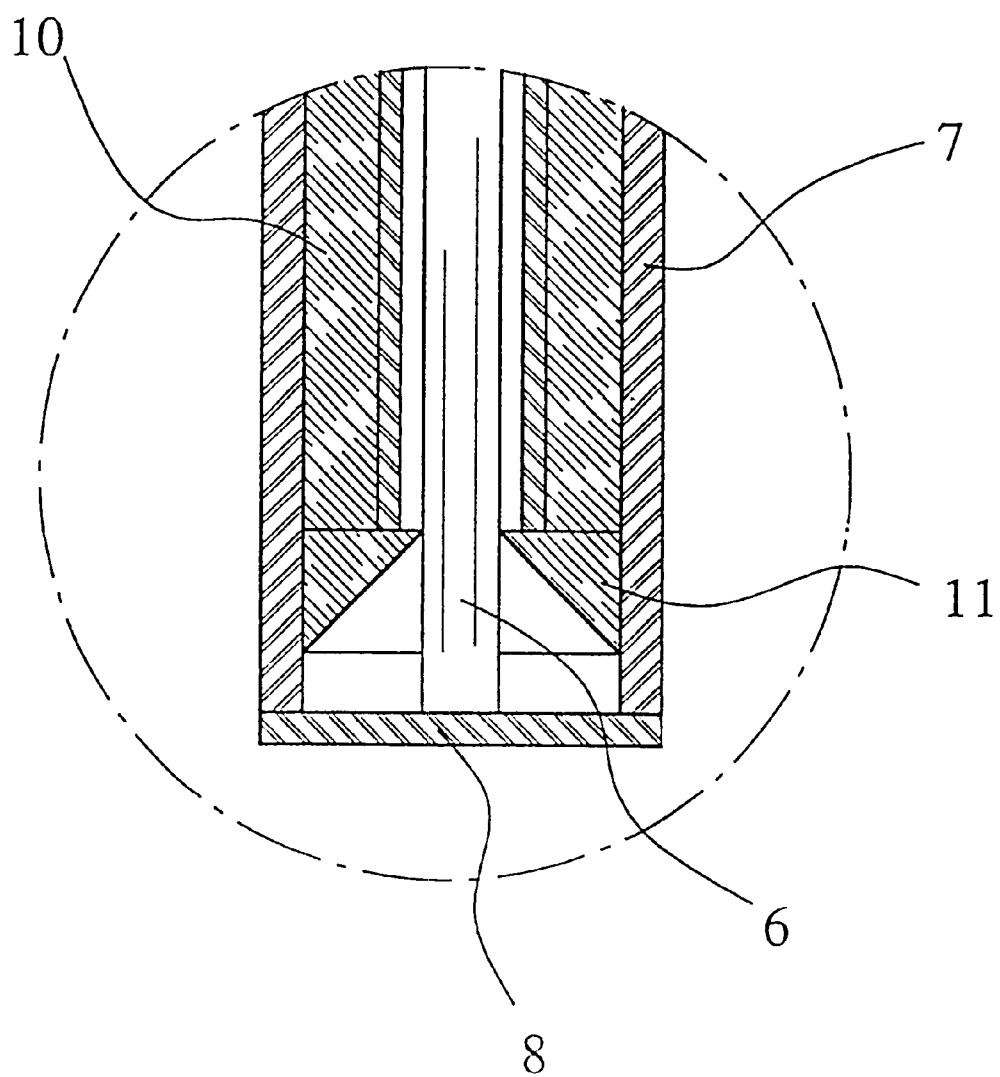
FIG. 2 shows, on a larger scale compared to FIG. 1, the end of the disclosed transceiver according to FIG. 1, facing the moving fluid.

As can be seen in the drawings and especially in FIG. 2, the sonic funnel 6 in the transmitting and/or receiving head 1 according to this invention is provided with a partially circular, cylindrical funnel sleeve 7. At the end facing the moving fluid 2, the sonic funnel 6 and the funnel sleeve 7 are closed off by means of a window 8. Thus, the ultrasound signals either travel from the ultrasonic transducer 5 via the sonic funnel 6 and the window 8 into the fluid 2, or, when extracted from the fluid 2, from there via the window 8 and the sonic finnel 6 to the ultrasonic transducer 5. As can be seen especially in FIG. 2, the end of the sonic funnel 6 is centered on the window 8. In addition, the diameter and thickness of the window 8 are so dimensioned as to permit the window 8 to oscillate at a maximum possible amplitude. The window 8 may be welded or cemented to the funnel sleeve 7.

As indicated in FIG. 1, the transmitting and/or receiving head 1 also includes an outer enclosure 9 surrounding the upper end of the sonic funnel 6 and the ultrasonic transducer 5.

The design example of a transmitting and/or receiving head 1 according to this invention, illustrated in FIG. 1, is a particularly preferable embodiment in that the finnel sleeve 7 is provided with an attenuating element 10 which extends essentially over the entire length of, and is connected to, the funnel sleeve 7. Near the window 8, the attenuator 10 is preceded by an impedance matching element 11 which in particularly effective fashion directs the undesirable sonic reflections at the window 8 into the attenuator 10. This impedance matching element 11 is preferably made of the same material as the attenuator 10, thus avoiding reflections at the interface between the impedance matching element 11 and the attenuator 10.

For the attenuator 10 and/or the impedance matching element 11 one preferably uses a sintered or porous, large-grained material, given that the attenuating efficacy is a function of the ratio between grain size and wavelength. Granular or sintered bronze with a grain size from 10 $\mu$m to 10 mm is a particularly suitable material for producing the attenuator 10 and/or the impedance matching element 11.

As in prior art, the ultrasonic transducer 5 of the transmitting and/or receiving head 1 according to this invention contains a piezo crystal 12. The cross section of the sonic funnel 6 corresponds to the cross section of the piezo crystal 12.

The length of the sonic funnel 6 is determined primarily by the thermal conduction resistance needed, in which connection reference is made to the above Equation (1); in other words, it depends on the maximum temperature of the fluid 2 flowing through the measuring tube 3, but is typically on the order of 50 mm.

The piezo crystal 12, and the end of the sonic funnel 6 facing the piezo crystal 12, preferably have a diameter of about 15 to 20 mm, while at its end facing the window, the diameter of the sonic funnel 6 is preferably about 5 mm.

In the embodiment of a transmitting and/or receiving head I according to this invention, as shown in FIG. 1, the upper end of the enclosure 4 is provided with a flange 13 and the lower end of the enclosure 9 is provided with a flange 14.

The enclosure 9 is thus connected with the enclosure 4 by way of its flange 14, screws 15 and the flange 13 of the enclosure 4, with a gasket 16 provided between the flanges 13 and 14.

As is shown in FIG. 1, the inner diameter of the enclosure 4 in the illustrated embodiment is substantially larger than the inner diameter of the enclosure 9 next to its flange 14. The upper end of the funnel sleeve 7 butts against the end of the enclosure 9 facing the enclosure 4. Due to the resulting impedance step, additional ultrasound-signal reflections will be directed into the attenuator 10.

The high level of sonic-signal attenuation in the funnel sleeve 7, brought about by the attenuator 10 and the impedance matching element 11, minimizes the risk of ultrasound-signal crosstalk between the funnel sleeve 7 and the enclosure 4. In general, the transmitting and/or receiving head 1 according to this invention can be produced from standard materials, allowing for the low-cost production of a sonic flowmeter that incorporates a transmitting and/or receiving head 1 according to this invention.

FIG. 2 is an enlarged illustration of the end of the sonic funnel 6 and the funnel sleeve 7 facing the moving fluid 2.

Centering the sonic funnel 6 on the window 8 causes the window 8 to oscillate at a maximum amplitude since the radiated sonic energy $\Pi_{dc}$ is proportional to the square of the oscillation amplitude u(s) per the following equation:

$$\Pi_{dc} = \tfrac{1}{2} \int \int_u{}^2 (s) R_r(s) ds \qquad \text{Equation (2)}$$

where Rr (s) is the reflection resistance of the surface S and u(s) is the oscillation amplitude; it follows that this also maximizes the sonic energy injected into the moving fluid 2.

The window 8, welded to the funnel sleeve 7, usually consists of the same material as the funnel sleeve 7. The material used for the funnel sleeve 7 and for the window 8 may for instance be steel and preferably high-grade alloy steel. Steel, and preferably high-grade alloy steel, is also used for the sonic funnel 6 so that at the interface between the sonic funnel 6 and the window 8 there will be only minor sonic reflections or none at all.

Having described the invention what is claimed as new and secured by Letters Patent is:

What is claimed is:

1. A transmitting and/or receiving head for a sonic flow meter measuring moving fluids comprising an enclosure, an ultrasonic transducer which transmits ultrasound signals into the moving fluid and/or receives ultrasound signals from the moving fluid and an ultrasound wave guide by way of which the ultrasound signals are transmitted into and/or from the moving fluid, said ultrasound wave guide being an elongated sonic funnel offering low thermal conductibility wherein a circular, cylindrical funnel sleeve is at least partly associated with the sonic funnel, the funnel sleeve being provided with a mechanical attenuator, said attenuator extending at least essentially over the entire length of the funnel sleeve and being connected with the funnel sleeve.

2. The transmitting and/or receiving head as defined in claim 1, wherein the sonic funnel is closed off with a window having a selected diameter and thickness and oscillating when subject to ultrasound signals, and wherein the end of the sonic funnel is centered on the window and the diameter and thickness of the window are so dimensioned as to maximize the oscillation amplitude of the window.

3. The transmitting and/or receiving head as defined in claim 1 or 2 wherein the sonic funnel has very low surface roughness.

4. A transmitting and/or receiving head for a sonic flow meter measuring moving fluids comprising an enclosure, an ultrasonic transducer which transmits ultrasound signals into the moving fluid and/or receives ultrasound signals from the moving fluid and an ultrasound wave guide by way of which the ultrasound signals are transmitted into and/or received from the moving fluid, said ultrasound wave guide being an elongated sonic funnel offering low thermal conductibility wherein a circular, cylindrical funnel sleeve is at least partly associated with the sonic funnel, the funnel sleeve being provided with a mechanical attenuator extending at least essentially over the entire length of the funnel sleeve and being connected with the funnel sleeve wherein the sonic funnel is closed off with a window, and wherein the attenuator is preceded on its window side by an impedance matching device which directs undesirable sonic reflections at the window into the attenuator.

5. The transmitting and/or receiving head as defend in claim 4 wherein the sonic funnel has very low surface roughness.

6. The transmitting and/or receiving head as defined in claim 4 or 5, wherein the material of the impedance matching element corresponds to the material of the attenuator.

7. The transmitting and/or receiving head as defend in claim 4 or 5, wherein sintered or porous, large-grained material is used for producing the attenuator and/or impedance matching device.

8. The transmitting and/or receiving head as defined in claim 7, wherein granular or sintered bronze with a grain size from 10 um to 10 mm is used for the attenuator and/or the impedance matching device.

9. The transmitting and/or receiving head as defined in claim 1 or 4, wherein the ultrasonic transducer is provided with a piezoelectric crystal element having a cross section and wherein the cross section of the sonic funnel corresponds to the cross section of the piezoelectric crystal element.

10. The transmitting and/or receiving head as defend in claim 1 or 4, wherein the ultrasonic transducer is sonically decoupled from the funnel sleeve.

11. A sonic flowmeter incorporating two transmitting and/or receiving heads according to claim 1 or 4 well as control and analysis circuitry which measures the runtime of the ultrasound signals for determining the volumetric flow, wherein the volumetric flow rate is determined by the control and analysis circuitry on the basis of the difference between the total runtime of the ultrasound signals between the ultrasonic transducers and the sum of the runtimes of the ultrasound signals in the sonic funnels.

* * * * *